United States Patent

Meunier et al.

[15] 3,664,506
[45] May 23, 1972

[54] APPARATUS FOR PURIFYING BLOOD

[72] Inventors: Renée Louise Meunier, Paris; Monique Adele Marmonier, Lyon, both of France

[73] Assignee: Sertna, Societe d'Etudes Et De Recherches De Techniques Nouvelles Appliquees S.A.

[22] Filed: Dec. 3, 1969

[21] Appl. No.: 881,800

[30] Foreign Application Priority Data

Dec. 3, 1969 France....................176342

[52] U.S. Cl..............................210/282, 210/284, 210/416
[51] Int. Cl................................................B01d 15/04
[58] Field of Search.....................210/22, 23, 416, 280, 282, 210/284; 259/66, DIG. 46

[56] References Cited

UNITED STATES PATENTS

| 3,273,717 | 9/1966 | Canterbury | 210/416 X |
| 3,522,346 | 7/1970 | Chang | 210/22 X |
| 3,194,638 | 7/1965 | Neuville | 259/66 X |
| 3,219,318 | 11/1965 | Hershler | 259/DIG. 46 |

FOREIGN PATENTS OR APPLICATIONS 322,234  7/1957  Switzerland..................259/DIG. 46

OTHER PUBLICATIONS

Chang, T. M. S., Transactions American Soc. For Artificial Internal Organs, Vol. 12, 1966 pp. 13–18

*Primary Examiner*—Samih N. Zaharna
*Attorney*—Breitenfeld & Levine

[57] ABSTRACT

Apparatus for purifying blood comprises a vessel containing one or more chambers arranged in series and containing micro-beads which enclose adsorbents and reagents for purifying blood. The vessel also includes a stator cavity which contains a pump rotor, preferably driven by an external rotary magnet. Means for agitating the beads in the chamber preferably consist of vanes connected to the pump rotor. In a preferred arrangement of the apparatus, the beads in a first chamber nearest the inlet contain urease and a cation-exchange resin in the sodium state, the beads of the second chamber contain activated charcoal and an exchange resin in the hydrogen state, and the beads of the third chamber contain an anion-exchange resin in the OH state.

5 Claims, 1 Drawing Figure

PATENTED MAY 23 1972
3,664,506
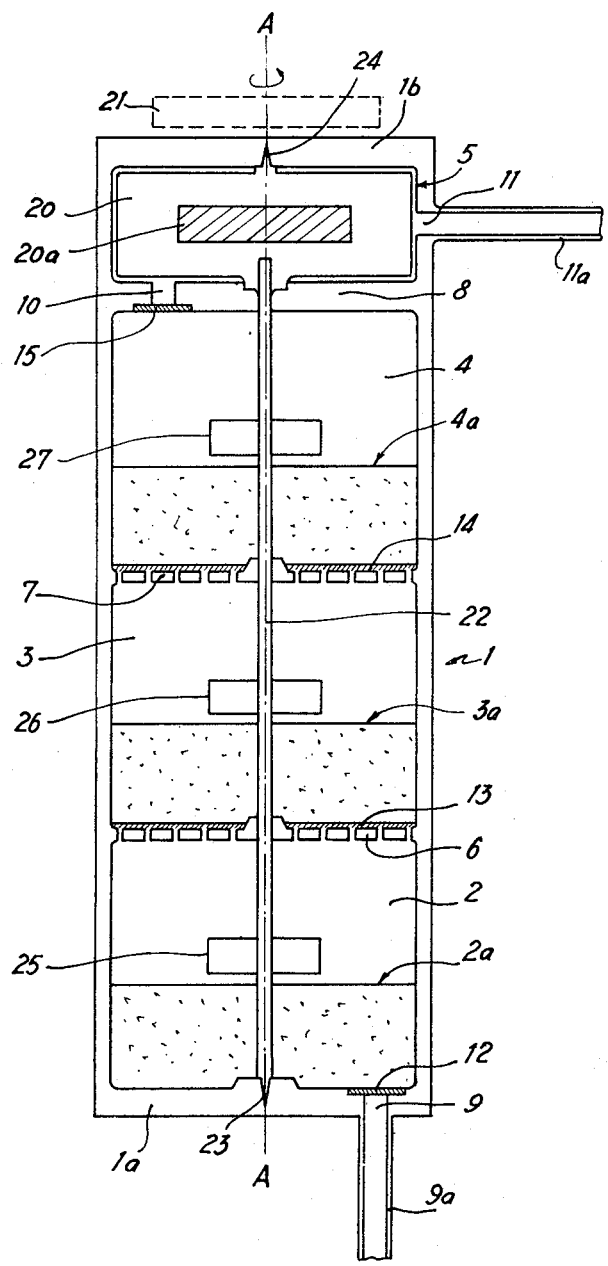
INVENTORS:
RENÉE J.L. MEUNIER
MONIQUE A. MARMONIER
By Breitenfeld & Levine
ATTORNEYS

APPARATUS FOR PURIFYING BLOOD

The present invention relates to various improvements in apparatus intended for renal purification known as "artificial kidenys," with the particular object of appreciably reducing the size of the apparatus while retaining its efficiency.

It is known that purifying apparatus of conventional type involves the dialysis of blood flowing across sheets of cellophane placed either on rotary drums or on flat sheets. The need to ensure a sufficient exchange rate makes it necessary to provide a large surface, amounting to several square meters, which greatly increases the cost and the dimensions of the apparatus, and makes it quite incapable of being moved about and usable only in hospital surroundings.

The invention is essentially based on the realization that it is possible to reduce the dimensions of such apparatus appreciably, by making use of the properties possessed by certain polymers which can be formed as beads or micro-beads of a diameter varying between 5 and 100 microns the walls of which being relatively thin and made in particular from nylon, collodion or silicone, permit physico-chemical exchange with the surrounding medium, provided these beads contain within them suitable physical, chemical, or biological reagents. The value of these beads of very small diameter resides in their spherical shape which ensures that they have a good mechanical resistance and gives them a very large exchange surface for a given volume.

Thus, by way of example, beads of 20 microns mean diameter have an exchange surface of 25 $dm^2$ per milliliter, which for 10 ml of beads offers an exchange surface of 2.5 $m^2$, corresponding to the dialyzer surface of a conventional artificial kidney.

It has been shown by T.M.S. Chang (Canadian Journal of Physiology and Pharmacology, 44,115 — 1965) that it is possible to prepare such beads, of a diameter between 0.005 and 5 mm, containing in their internal cavity various biological, physico-chemical or chemical reagents, by techniques known in the art.

In the case of beads intended for renal purification of urea and nitrogenous residues, such as uric acid and creatinine, it has been suggested that reagents capable of absorbing urea or of destroying it by enzyme action might be used. However, the adsorbents at present known have only a small capacity as regards urea, while the urease capable of destroying it by an enzymatic process involved the evolution of large quantities of ammonia. Various authors, for example, T.M.S. Chang (Trans. Amer. Soc. Artificial Internal. Organ, 12–13, 1966) and S.N. Levine (J. Biomed. Material Research I — 375, 1967) have suggested that the ammonia thus formed could be absorbed on a cation exchange resin located in the interior of the capsules. Unfortunately the fixing of the ammonia on the resin results in the liberation of large quantities of sodium or potassium, which are particularly undesirable.

This is why one of the important features of the present invention is the avoidance of this disadvantage by making use of other cation and anion exchange resins capable of fixing the undesirable intermediate products and yielding only water at the final stage.

In accordance with another preferred feature of the invention a plurality of different exchange resins is employed in a purifying vessel comprising a plurality of separate, suitably arranged chambers having different functions such that the fixing reactions may take place in a predetermined sequence.

In a practical and particularly simple embodiment of the invention there is used a purifying vessel comprising adsorbent materials, more especially activated charcoal, contained within the interior of the beads and capable of fixing urea, uric acid and creatinine. However, the capacity of these absorbents is limited and it is advantageous to perform periodically, with the same apparatus, an elution with water of physiological water of the compounds fixed on the adsorbent.

In accordance with another preferred feature of the invention systematic agitation of the purifying beads is effected within the vessel in such manner as to increase their exchange capacity within the medium of the blood to be purified. This is effected, either by using mechanical stirring with the aid of stirrers driven through the intermediary of magnets, or by incorporating in the beads a magnetic material, for example particles of magnetic ceramic material, and subjecting them to the action of a magnetic field which is variable in intensity and direction and is produced, for example, by an electric current.

Finally, in order to eliminate any source of external contamination there is incorporated in the vessel, in accordance with the invention, a circulating pump, preferably driven by a magnetic field whereby any driving connection between the interior and the exterior is avoided. Among compatible materials certain plastics materials such as polycarbonates readily enable such an apparatus to be constructed, but the choice of materials is not in any way restricted to polycarbonates.

One or more apparatus or purifying vessels according to the invention may be used along or conjointly with dialysis apparatus, so as to reduce the space occupied while retaining the efficiency.

The following description and the accompanying drawing enable the manner in which the invention is performed to be better understood.

The accompanying drawing illustrates in axial section a purifying vessel according to the invention in a practical form comprising separate specialized chambers successively transversed by the blood to be purified.

The vessel 1, which is in the form of a hollow cylinder, is made from a compatible plastics material, for example, a polycarbonate, its interior surface being advantageously treated with an anti-coagulant. In the interior of the hollow vessel, shown in the drawing in vertical position, are formed successively three chambers 2, 3 and 4 and an upper cavity 5, the chamber 2 being bounded by the bottom wall 1a and a perforated inner partition 6, the chamber 3 by the perforated partition 6 and a similar perforated partition 7, the chamber 4 by the partition 7 and a partition 8, the upper cavity 5 by the partition 8 and the upper end wall 1b of the vessel 1. The perforations in the partitions 6, 7 and 8 permit passage of fluid from the chamber 2 to the chamber 3 and from the chamber 3 to the chamber 4. The base 1a has an opening 9 for the admission of blood to be purified, connected to a supply pipe 9a. Furthermore, an opening 10 in the partition 8 provides communication between the chamber 4 and the cavity 5. Finally, the cavity 5 communicates with the exterior by way of an outlet opening 11 connected to an outlet pipe 11a.

Each of the chambers 2, 3 and 4 is intended to receive purifying beads of specialized function, the volume of these beads in a state of rest being such as to establish the levels 2a, 3a and 4a respectively in the chambers.

The blood to be purified, entering the cartridge 1 through the inlet opening 9 and leaving through the outlet opening 11, passes from one chamber to the next, and then into the cavity 5. In order that the purifying beads may not leave their respective chambers, there is provided on the mouth of the opening 9, in the chamber 2, on the perforations of the partition 6, on the perforations of the partition 7, and on the inlet side of the opening 10 thin porous plates or the like, 12, 13, 14, 15 respectively, for example plates of nylon.

In accordance with an essential feature of the invention the cavity 5 constitutes the stator of a pump incorporated in the vessel and for this purpose contains a rotor 20 rotatable amout the axis AA of the cylindrical vessel and producing within the vessel suction tending to draw the liquid from the vessel through the opening 10 and drive it out through the opening 11. The rotor 20 is, for example, a vaned or bladed rotor of known type.

Actuation of the rotor is preferably effected by incorporating in its central part a permanent magnet 20a (driven magnet) and at the exterior of the cartridge 1 on the other side of the wall 1b is arranged a driving magnet 21 rotatable about the axis AA. Rotation of magnet 21 may be effected, for example, by a micro-motor, but it is the magnetic coupling between 21 and 20a that causes the rotation of the rotor 20 which actuates the pump.

With the rotor 20 is associated a driving shaft 22 extending through the chambers of the vessel on the axis thereof. The whole of the assembly 20,22 is mounted on two pivots 23, 24 cooperating respectively with the walls 1a and 1b.

In each of the chambers 2, 3, 4 the shaft 22 is associated with stirring vanes 25, 26, 27 arranged in each chamber above the level of the purifying beads when in a state of rest.

Finally, the cartridge may comprise multiway inlet and outlet valves to permit the taking of samples and/or elution.

With the structure described above, the operation of the purifying vessel is easy to understand. The rotor 20 driving the shaft 22 being in motion the blood to be purified enters the vessel at 9 and leaves at 11 after passing through each individual chamber, the purifying beads being well distributed in each chamber by the stirring vanes.

Of course, the manner of driving the rotor 20 that has been described is only one preferred example of a way of driving it without the passage of driving means through a wall; other conventional methods could be used. The same applies to the location of the pump in the vessel assembly. Similarly, the stirring of the beads could be effected, without going outside the scope of the invention, by incorporating in them a certain number of beads of magnetic material of the same volume, these additional beads being driven by an external movable magnet, or more generally by any external device capable of creating a variable magnetic field. Finally, according to the method of purifying selected, one or a plurality of chambers may be used.

Some examples of purification will now be given, wherein use is made of a vessel according to the invention.

EXAMPLE 1

In this case there is used a vessel having three chambers each of which has a volume of about 100 ml.

The first chamber that the blood to be purified enters contains 50 ml of nylon beads of 20 microns diameter, in accordance with the Chang technique, containing urease for decomposing urea and a cation-exchange resin, for the purpose of fixing the ammonia thus formed, the resin being in the sodium state.

The second chamber, into which the partially purified blood penetrates contains 50 ml of beads enclosing activated charcoal capable of fixing uric acid and creatinine, as well as an exchange resin in the hydrogen state for fixing the excess of sodium resulting from the fixation of ammonia in the preceding stage.

Finally, the hydrochloric acid formed in the course of the second stage is fixed in the third chamber by means of 50 ml of beads containing an anion-exchange resin in the OH state which fixes the chlorine ion and forms water.

EXAMPLE 2

In this example there is used a vessel of the type defined, with a single chamber of volume of about 200 ml.

This chamber is provided with a mixture constituted by 150 ml of beads of silicone containing particles of activated charcoal of mean diameter 20 microns adapted to fix urea, uric acid and creatinine, and 15 ml of beads of polystyrene containing particles of magnetic ceramic material of 50 microns diameter.

The inlet and outlet pipes are provided with two-way or multi-way valves that permit the introduction of solutions for washing the beads and for periodic elution of the urea adsorbed by the charcoal, a particularly active solvent being physiological serum. Furthermore, the vessel is provided with an external electrically conductive winding through which is passed an electric current of sufficient intensity to effect movement of the beads containing the magnetic material, which by their movement entrain the beads containing the activated charcoal, thereby increasing their capacity for exchange. This apparatus has been tested on a dog of 30 kg in which the blood urea count amounted, after perfusion with urea to 4.26 g. per liter of blood.

Purification was effected at a speed of 50 ml per minute for 15 minutes, followed by elution with sterile water at a speed of 100 ml/minute for the same period.

This sequence of operations, carried out for 210 minutes, enabled the blood urea count of the animal to be brought to 0.55 g. per liter.

Among other modifications which may be made, the vessel according to the invention may include auxiliary heating means such that the temperature of the blood that passes through it may be kept at the physiological temperature; for example the vessel may be enclosed by a skirt, the space between the skirt and the cartridge serving for the circulation of a heating liquid.

We claim:

1. Apparatus including a replaceable cartridge for purifying blood, comprising:
   a. a cartridge housing having an inlet for connection to a source of blood to be purified and an outlet for connection to a receiver of purified blood,
   b. an impeller cavity and at least one chamber within said housing between said inlet and outlet, said cavity and chamber communicating with each other,
   c. blood-purifying beads partially filling said chamber,
   d. a vane within said chamber for agitating said beads while blood flows through said chamber,
   e. a pump impeller rotatably mounted within said impeller cavity, and means connecting said vane to said impeller so that said vane rotates with said impeller,
   f. a drive motor external to said housing, and
   g. separable coupling means for transmitting rotary motion from said motor to said impeller for causing the latter to pump blood from said inlet, through said chamber and impeller cavity, and out said outlet, whereby said cartridge may be separated from said motor and blood source and receiver and replaced with another similar cartridge.

2. A cartridge as defined in claim 1 wherein said separable coupling includes a magnet within said cavity connected to said impeller, and a cooperating magnet outside said housing driven by said motor.

3. A cartridge as defined in claim 1 wherein said beside have micro-membrane walls enclosing an adsorbent.

4. A cartridge as defined in claim 3 wherein said adsorbent is activated charcoal.

5. A cartridge as defined in claim 1 including three chambers arranged in series within said housing, and wherein said beads have micro-membrane walls enclosing reagents for purifying blood, said beads in the chamber nearest said inlet containing urease and a cation-exchange resin in the sodium state, the beads in the next succeeding chamber containing activated charcoal and an exchange resin in the hydrogen state, and the beads in the chamber closest said outlet containing an anion-exchange resin in the OH state.

* * * * *